(12) United States Patent
Rao

(10) Patent No.: US 7,363,485 B1
(45) Date of Patent: Apr. 22, 2008

(54) CONTROLLING ADVANCED CONFIGURATION AND POWER INTERFACE CONTROL METHODS

(75) Inventor: Srinivasan N. Rao, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 399 days.

(21) Appl. No.: 10/976,133

(22) Filed: Oct. 28, 2004

(51) Int. Cl.
*G06F 1/24* (2006.01)
*G06F 9/00* (2006.01)

(52) U.S. Cl. .................. 713/100; 713/310; 713/320

(58) Field of Classification Search ............ 713/310, 713/100, 320
See application file for complete search history.

(56) References Cited

U.S. PATENT DOCUMENTS

| | | | |
|---|---|---|---|
| 6,823,516 B1* | 11/2004 | Cooper | 718/108 |
| 7,093,142 B2* | 8/2006 | Hagiwara et al. | 713/300 |
| 7,117,377 B2* | 10/2006 | Hagiwara et al. | 713/300 |
| 2003/0041271 A1* | 2/2003 | Nalawadi et al. | 713/300 |
| 2004/0006719 A1* | 1/2004 | Kuo et al. | 713/300 |

OTHER PUBLICATIONS

"Advanced Configuration and Power Interface Specification," Hewlett-Packard/Intel/Microsoft/Phoenix/Toshiba.

* cited by examiner

*Primary Examiner*—Chun Cao
*Assistant Examiner*—Jaweed A Abbaszadeh
(74) *Attorney, Agent, or Firm*—Hope Baldauff Hartman, LLC

(57) ABSTRACT

The control method names used in the advanced configuration and power management interface (ACPI) are modified to add control flexibility to the interface. The interface is between a basic programming system such as BIOS and an operating system, and the modification of the control method names controls the enabling of the control methods associated with control method names. During setup a user dialogs with the computing system and select settings for configuration and power management features for the system. The selected settings indicate the features corresponding to control method names to be modified. The control method names to be modified are searched for based upon the selected settings. The control method names found by the search based on the settings are modified so that the operating system will not recognize the control method names and the associated control method will not be enabled. The checksum in the modified control method name is updated to reflect the change in the name so that the checksum is correct and the modified control name will be valid.

12 Claims, 3 Drawing Sheets

CONTROLLING ADVANCED CONFIGURATION AND POWER INTERFACE CONTROL METHODS

FIELD OF THE INVENTION

This invention relates to the Advanced Configuration and Power Interface (ACPI). More particularly, the invention relates to the control of the control methods in the ACPI in order to add flexibility in controlling ACPI features executed by the operating system.

BACKGROUND OF THE INVENTION

The ACPI is an interface designed to move the control of computing system configuration and power management from the BIOS (Basic Input Output System) to the operating system. The ACPI specification is an industry standard in the personal computer hardware and software industry. The specification is available over the Internet on the ACPI website.

BIOS program code is firmware, and the basic system software for the computer. The operating system program code runs on top of the BIOS and application program code in turn runs on top of the operating system. The BIOS is referred to as firmware because it is permanently burned into a read only memory chip.

The ACPI includes registers ACPI BIOS and ACPI tables. Architecturally, the ACPI is an interface positioned between the BIOS/platform hardware layer and the operating system layer. The ACPI BIOS is a stream of code in AML (ACPI machine language) code. The ACPI is also firmware and is burned into a ROM chip.

Because the ACPI is in firmware there is no flexibility in being able to control use of features of the ACPI at the operating system level. Whatever features are burned into the ACPI firmware are used by the operating system. Accordingly, there is a need for more flexibility in use of the ACPI features to configure and power manage the computing system.

SUMMARY OF THE INVENTION

In accordance with this invention, the above and other problems have been solved by modifying control method names used in the advanced configuration and power management interface. The interface is between a basic programming system and an operating system, and the modification of the control method names controls the enabling of the control methods associated with control method names. During setup a user may dialog with the computing system and select settings for configuration and power management features for the system. The selected settings indicate the features corresponding to control method names to be modified. The control method names to be modified are searched for based upon the selected settings. The control method names found by the search based on the settings are modified so that the operating system will not recognize the control method names and the associated control method will not be enabled. The checksum in the modified control method name is updated to reflect the change in the name so that the checksum is correct and the modified control name will be valid.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

The ACPI code is implemented as an AML bit stream. In this AML bit stream are control method names having a particular format. These control method names represent configuration and power management control features that will be executed by the operating system when the control method name is recognized. The operating system looks for the control method name format before executing the control method specified. If the control method name is not recognized by the operating system then the associated control method is not executed.

The format of these control method names as predefined by the ACPI specification always begins with an "_" underscore character space. Thus, a configuration state control method name might be _CST, and a power state control method name might be _PST. The operating system will be looking for a control method name beginning with an underscore. If the control method name begins with an alphanumeric character, then the operating system will treat the name as a user defined control method name. In effect by changing a control method name the control method feature associated with the previous name is not performed. Accordingly, the settings specified by the user during the setup utility may be used to change the control method names from underscore followed by characters to all characters. This will have the effect of disabling the features associated with the changed control method names.

Figure 1:
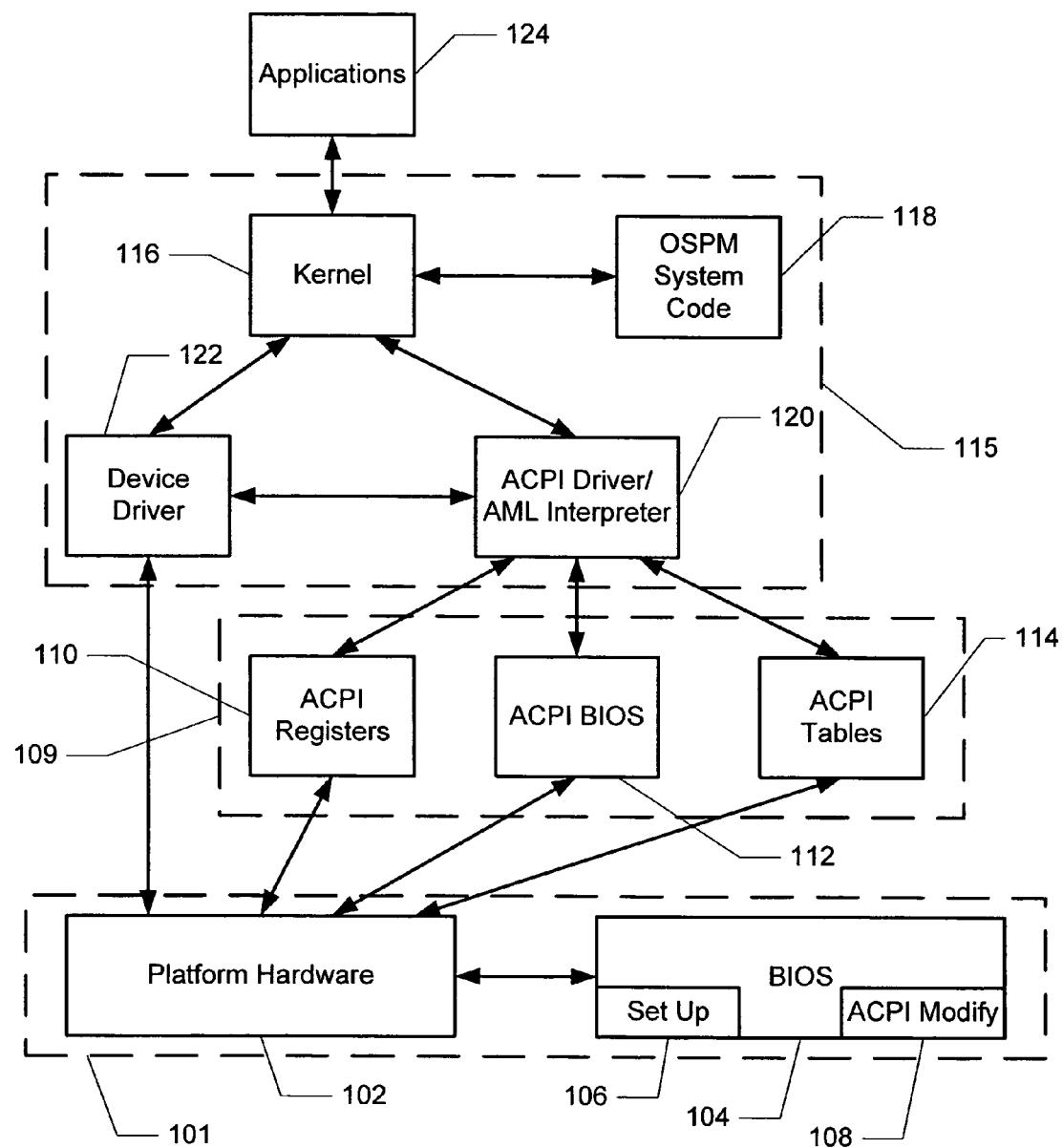
FIG. 1 shows a system architecture making use of an ACPI and, more particularly, shows the location of a set up utility and the ACPI modify module in the BIOS code in one embodiment of the invention.

The architectural diagram in FIG. 1 of a computing system using ACPI illustrates the location of the ACPI and the inventive program modules used to modify the control method names and thereby the operating system's interpretation of the configuration and power management features provided by the ACPI. At the lowest level 101 of the architecture is the platform hardware 102 and the BIOS 104. The BIOS contains the set up utility module 106 and the ACPI modify module 108. The platform hardware comprises a computing system such as a desktop computer, a laptop computer, a tablet computer, a client computer, a server computer or any other computing system.

A computing system, such as platform hardware 102, typically includes at least some form of computer-readable media. Computer readable media can be any available media that can be accessed by the computing system. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system. In the environment of the architecture in FIG. 1, the BIOS containing the setup utility and the ACPI modify module are stored on ROM and read out for execution by the platform hardware 102, and the AML code of the ACPI is initially on ROM but is transferred from ROM to RAM for execution by the platform hardware using the operating system code.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product to reflect the product delivery of program code on computer readable media containing the computer process implementing the invention.

In FIG. 1, above the platform hardware 102 and BIOS 104 is the ACPI 109, and includes ACPI registers 110, the ACPI BIOS 112, and the ACPI tables 114. The ACPI registers, BIOS and tables are originally in ROM but are transferred into RAM to be operated on by the operating system. At the operating system layer 115 there is the operating system kernel 116, the operating system power management (OSPM) code 118, the ACPI driver/AML interpreter 120, and the device driver 122. The ACPI driver/AML interpreter works with the kernel 116 and the device driver 122 to configure and power manage the computing system under the control of the operating system. A complete understanding of how this is accomplished is described in the publicly available ACPI specification. Above the operating system layer are the computer program applications 124 that run on the operating system.

Figure 2:
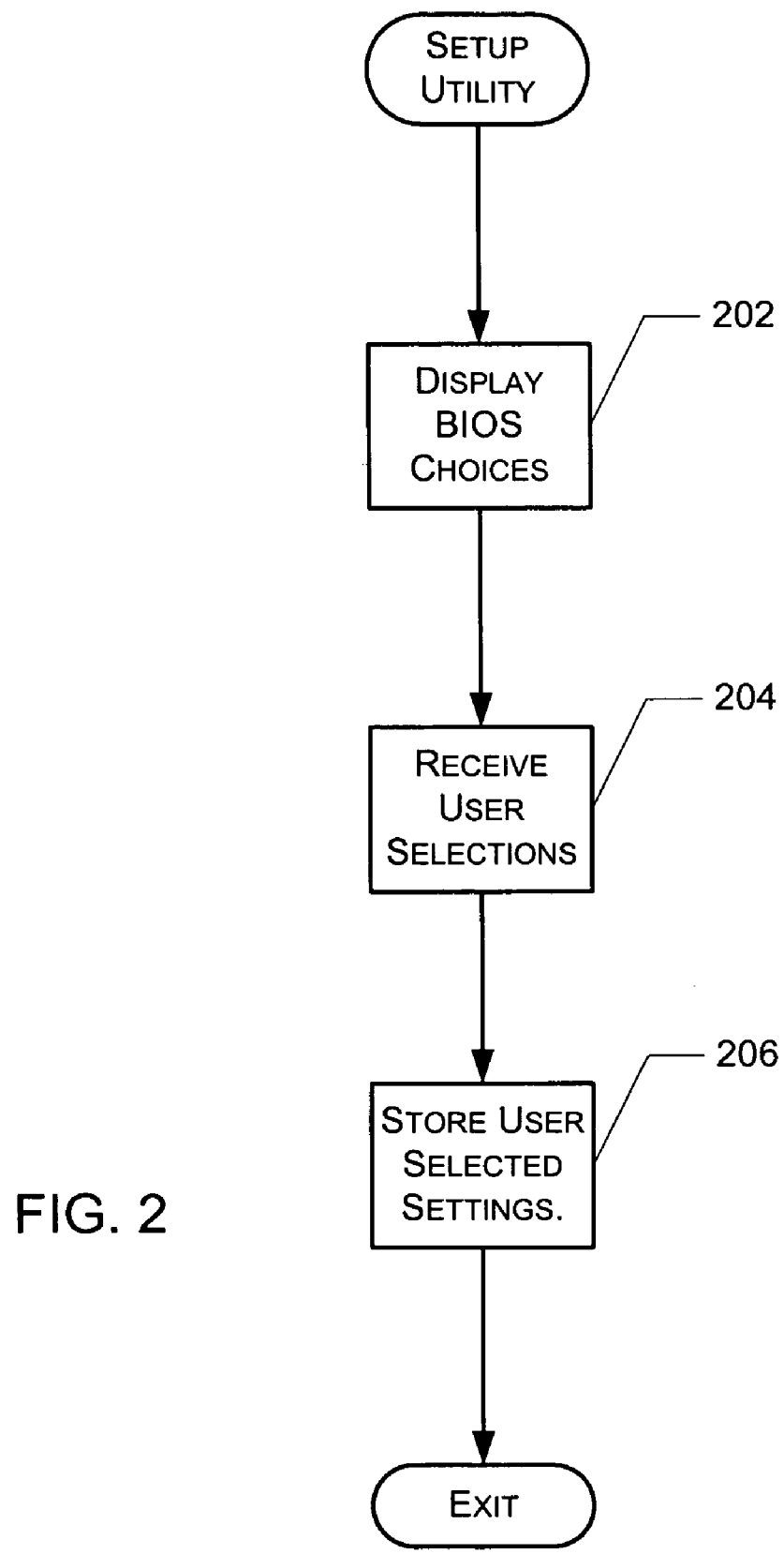
FIG. 2 shows the operational flow for the set up utility 106 of FIG. 1.
Figure 3:
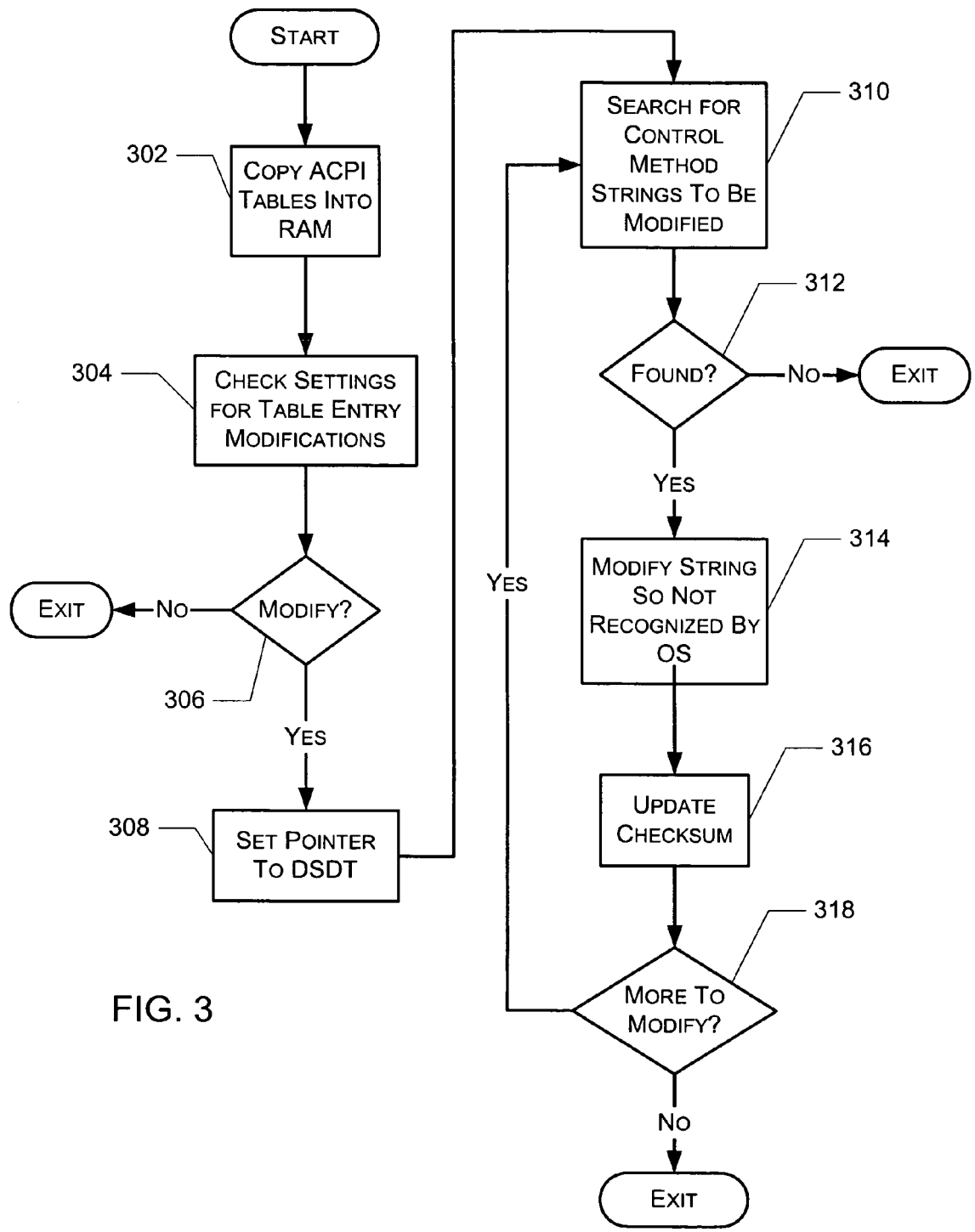
FIG. 3 shows the operational flow for the ACPI modified module 108 of FIG. 1.

In FIGS. 2 and 3 operational flows are shown that implement embodiments of the invention. These logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein may be referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 2 illustrates the setup utility in BIOS 104 that allows a user to select settings to modify features of the ACPI interpreted by the operating system. In FIG. 2, the setup utility at display operation 202 displays a dialog box providing the user with BIOS and, in particular, ACPI BIOS choices. These choices might include power management features for a device driver, such as a display, or a disc drive. The user could view these choices and select the level of power management desired. Receive operation 204 receives the user's selections for the feature settings. The save operation 206 then saves these selected settings for subsequent use by the ACPI modify module 108.

FIG. 3 illustrates the operations performed by the ACPI modify module. Copy operation 302 in FIG. 3 copies the ACPI tables into RAM storage. These tables include the AML bit stream, which constitutes the ACPI BIOS. In this AML bit stream are control methods having a particular format. The operating system looks for this format when executing a control method specified by the AML code in accordance with the ACPI specification. In one embodiment, the format of these control method names always begins with an "_" underscore character space. Thus, a processor control state control method name might be _CST, and a power state control method name might be _PST. The operating system will be looking for a control method name beginning with an underscore. If the control method name begins with an alphanumeric character, then the operating system will not execute the control method and, thus, will not enable the feature associated with that control method. Accordingly, the settings specified by the user during the setup utility may be used to change the control method name from underscore followed by characters to all characters. This will have the effect of disabling the feature associated with that control method name.

In FIG. 3 the check settings operation looks for selected settings saved for the modification of table entries in the ACPI tables. Modify test 306 detects whether there are settings and if not, the operation flow exits from the ACPI modify module. If there are settings for table entry modifications, then the operation flow branches Yes to set pointer operation 308. Set pointer operation 308 points to the DSDT containing the AML code with the table entry, i.e. control method name, to be modified.

Search operation 310 then searches for the control method strings to be modified by the settings selected by the user. When a control method string to be modified is found, the found test operation 312 branches Yes to the modify string operation 314. If the found test does not detect a method string to be modified, an error has occurred and the operational flow exits from the ACPI modify module.

Modify string operation 314 will now insert an alphanumeric character, such as the letter A for the underscore in the string that is being modified. By modifying the string, i.e. the control method name, the operating system will no longer recognize the name and that control method and its associated feature will be skipped, or, in other words, the feature will disabled.

After the control method name has been modified, it is also necessary to update the checksum associated with that control method name. Otherwise, the operating system will flag the table entry as an error. The checksum may be updated by simply zeroing out the present checksum, adding all the bytes in the control method name to produce a sum, inverting each bit in that sum, i.e. not the sum value, and entering the not-sum value in the checksum field. This will cause the checksum to be satisfied when it is tested by the operating system.

After the update operation the more-to-modify test operation 318 checks whether all of the control method names to be modified have been modified. If there are more control method names to be modified, then the operational flow branches yes back to search operation 310. Search operation 310 finds the next control method string and the flow passes to modify string operation 314. The loop through search operation 310, modify string operation 314, and update checksum operation 316 continues until all control method names to be modified have been modified. This condition is detected by the more-to-modify test 318 branching the operational flow No to exit the ACPI modify module.

In an alternative embodiment the checksum could be updated after all of the control method names have been modified. In this embodiment the update check sum operation would occur between test operation 318 and the exit from the ACPI modify module in FIG. 3.

In another embodiment of the invention, the control method name might be written into ROM as all characters, for example BCST. Under the ACPI specification this would mean that the default condition for this control method is disabled. In this situation the control method could be enabled when a setting from the user requests it be enabled. The ACPI modify module would now modify the BCST name to _CST by changing the character B to an "_" underscore. The operating system would recognize the control method name and the control method would be enabled.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for modifying a control method name in an interface between a basic programming system and an operating system to control enabling of a control method associated with the control method name, the method comprising:
    checking for a selected setting indicating that the control method name is to be modified;
    searching for the control method name to be modified based upon the selected setting;
    modifying the control method name so that the operating system will not recognize the control method name and will not enable the control method associated with the control method name, if the selected setting indicates that the control method name not be recognized;
    after the control method name is modified, updating only a checksum associated with the modified control method name, wherein updating only the checksum associated with the modified control method name includes:
        zeroing out the checksum associated with the modified control method name,
        summing bytes of the modified control method name to produce a sum,
        inverting bits in the sum to create an updated checksum, and
        associating the updated checksum with the modified control method name so that the modified control method name will be valid to the operating system.

2. The method of claim 1 further comprises:
    displaying BIOS feature choices to a user;
    receiving a selection of at least one of the BIOS feature choices from the user;
    converting the selected at least one of the BIOS feature choices into the selected setting for the control method name to be modified.

3. The method of claim 2 wherein the interface is an advanced configuration and power management interface and the BIOS feature choices are configuration and power management feature choices.

4. An advanced configuration and power management system for providing flexibility to an operating system to not enable features in a computing system, the system comprising:
    a check settings module operative to identify, based on a selected setting, a control method name of a control method to be disabled;
    a search module responsive to the check settings module and operative to find the control method name identified by the check settings module;
    a modify module operative to change one or more characters in the identified control method name to control whether or not the identified control method name will be recognized by the operating system and thereby whether a feature in the computing system associated with the control method of the identified control method name will be enabled or disabled; and
    an update module operative to update only a checksum associated with the modified control method name by zeroing out the checksum associated with the changed control method name, after the one or more characters in the identified control method name are changed, summing bytes of the changed control method name to produce a sum, inverting bits in the sum to create an updated checksum, and associating the updated checksum with the changed control method name so that the changed control method name will be valid to the operating system.

5. The system of claim 4 wherein the modify module is further operative to change the one or more characters in the identified control method name to an alphanumeric character to disable the feature associated with the control method of the identified control method name.

6. The system of claim 4 wherein the modify module is further operative to change the one or more characters in the identified control method name to an underscore symbol to enable the feature associated with the control method of the identified control method name.

7. The system of claim 4 further comprising:
    a display module operative to display ACPI feature choices;
    a receive module operative to receive a selection of at least one of the ACPI feature choices and provide the selected setting based on the selection.

8. Computer-readable storage media containing a computer program for executing on a computing system a computer process for modifying a control method name in an advanced configuration and power interface between a basic input/output system and an operating system to control a control method associated with the control method name, the computer process comprising:
    checking for a selected setting indicating that the control method name is to be modified;

searching for the control method name to be modified based upon the selected setting;

modifying the control method name to be modified so that the operating system will not recognize the control method name and will not enable the control method associated with the modified control method name;

after the control method name is modified, updating only a checksum associated with the modified control method name, wherein updating only the checksum associated with the modified control method name includes:

zeroing out the checksum associated with the modified control method name, summing bytes of the modified control method name to produce a sum, inverting bits in the sum to create an updated checksum, and associating the updated checksum with the modified control method name so that the modified control method name will be valid to the operating system.

9. The computer-readable storage media of claim 8 wherein the computer process further comprises:

displaying configuration and power management choices;

receiving a selection of at least one of the configuration and power management choices; and converting the selected at least one of the configuration and power management choices into the selected setting for the control method name to be modified.

10. The computer-readable storage media of claim 8 wherein modifying the method name comprises:

changing a character of the control method name from an alphanumeric character to a symbol.

11. The computer-readable storage media of claim 8 wherein modifying the control method name comprises:

changing a character of the control method name from a symbol to an alphanumeric character.

12. The method of claim 1, further comprising modifying the control method name so that the operating system will recognize the control method name and will enable the control method associated with the control method name, if the selected setting indicates that the control method name be recognized.

* * * * *